United States Patent
Yonezawa et al.

(10) Patent No.: US 6,220,565 B1
(45) Date of Patent: Apr. 24, 2001

(54) SAFETY VALVE ASSEMBLY

(75) Inventors: Keitaro Yonezawa; Tsutomu Shirakawa, both of Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 09/500,955

(22) Filed: Feb. 15, 2000

(30) Foreign Application Priority Data

Feb. 19, 1999 (JP) .................................................. 11-040744

(51) Int. Cl.[7] .................................................. F16K 31/12
(52) U.S. Cl. ............................................ 251/30.04; 251/38
(58) Field of Search ........................... 251/30.01, 30.02, 251/30.03, 30.04, 38, 50, 52

(56) References Cited

U.S. PATENT DOCUMENTS

| 4,085,669 | | 4/1978 | Yonezawa . | |
|---|---|---|---|---|
| 4,699,351 | * | 10/1987 | Wells | 251/38 X |
| 4,799,645 | * | 1/1989 | Kramer et al. | 251/30.04 |
| 5,048,790 | * | 9/1991 | Wells | 251/30.04 |
| 5,620,024 | | 4/1997 | Yonezawa . | |
| 5,676,342 | * | 10/1997 | Otto et al. | 251/38 |
| 5,787,926 | * | 8/1998 | Mukumoto et al. | 251/50 X |
| 6,149,124 | * | 11/2000 | Yang | 251/30.03 |

FOREIGN PATENT DOCUMENTS 54-23474    8/1979   (JP) .

* cited by examiner

Primary Examiner—Kevin Shaver
Assistant Examiner—Eric Keasel
(74) Attorney, Agent, or Firm—Bacon & Thomas, PLLC (57) ABSTRACT

A main valve (5) has a first valve seat (11) to which a compression spring (21) urges a first closure member (14). A restricting passage (16) and an actuation chamber (17) for valve closing are arranged within the first closure member (14) in order. A valve-opening holding chamber (25) is formed from an inner space defined by a fitting wall (23) with which the first closure member (14) fits at a final time of its closing movement. The actuation chamber (17) communicates with a second valve seat (31) of a pilot valve (6). A pushing spring (37) brings a second closure member (34) into closing contact with the second valve seat (31). The second valve seat (31), the first valve seat (11), the actuation chamber (17) and the valve-opening holding chamber (25) have respective sectional areas (S), (T), (U) and (V) set to values enlarging one after the other in the mentioned order.

7 Claims, 5 Drawing Sheets

SAFETY VALVE ASSEMBLY

BACKGROUND OF THE INVENTION

1. Technical Field

The present invention relates to a pilot-operated safety valve assembly and more particularly to a safety valve assembly suitable for a hydraulic overload protector of a mechanical press.

2. Description of Prior Art

There is a conventional safety valve assembly which is recited in Japanese Patent Publication No. 54-23474 the present inventors previously proposed, as an example of the safety valve assembly of this type.

The conventional safety valve assembly comprises a cylindrical main valve member brought into butting contact with a pilot valve member urged by a pushing spring for setting a safety operation pressure. The butting portion of the main valve member constitutes a relief valve seat.

In order to immediately reduce an abnormally increased pressure of fluid, it is necessary to enlarge a maximum relief amount at the time of a safety operation.

However, the safety valve assembly of the conventional structure has only one relief valve seat. Therefore, a trial to enlarge the maximum relief amount increases a sectional area of a hole of the relief valve seat to result in enlarging a pressure receiving area which starts the pilot valve member opening. And fluid pressure acting on the pressure receiving area determines a pushing force of the pushing spring. Accordingly, it is required to adopt a strong and large one for the pushing spring, which results in enlarging the safety valve assembly.

SUMMARY OF THE INVENTION

The present invention has an object to provide a compact safety valve assembly that can quickly perform a safety operation.

In order to accomplish the above object, an invention of claim 1 has constructed a safety valve assembly in the following manner, for example, as shown in FIGS. 1 to 3, FIG. 4 or FIG. 5.

The safety valve assembly is adapted to open a main valve 5 by opening a pilot valve 6. The main valve 5 comprises a first valve seat 11 provided between a pressure port (P) and a discharge port (R), a first closure member 14 which makes an opening and closing movement to the first valve seat 11, and an urging means 21 for urging the first closure member 14 to the first valve seat 11. The first closure member 14 has an interior area provided with a restricting passage 16 communicating with an interior area of the first valve seat 11. The restricting passage 16 has an outlet communicating with an actuation chamber 17 for valve closing which pressurizes the first closure member 14 in a closing direction. Arranged in a radially outer space of the first valve seat 11 between the pressure port (P) and the discharge port (R) is a fitting wall 23 with which the first closure member 14 fits by a predetermined length at a final time of its closing movement. A fitting portion 24 of the fitting wall 23 defines an inner space which forms a valve-opening holding chamber 25. When an inner pressure of a second valve seat 31 communicating with the actuation chamber 17 for valve closing has exceeded a set pressure, the pilot valve 6 is arranged to separate a second closure member 34 from the second valve seat 31 against a pushing means 37 to discharge fluid within the second vale seat 31 to an exterior area. A sealing sectional area (S) of the second valve seat 31, a sealing sectional area (T) of the first valve seat 11, a pressurizing sectional area (U) of the actuation chamber 17 for valve closing and a pressurizing sectional area (V) of the valve-opening holding chamber 25 are set to values enlarging one after the other in the mentioned order.

Figure 2A:
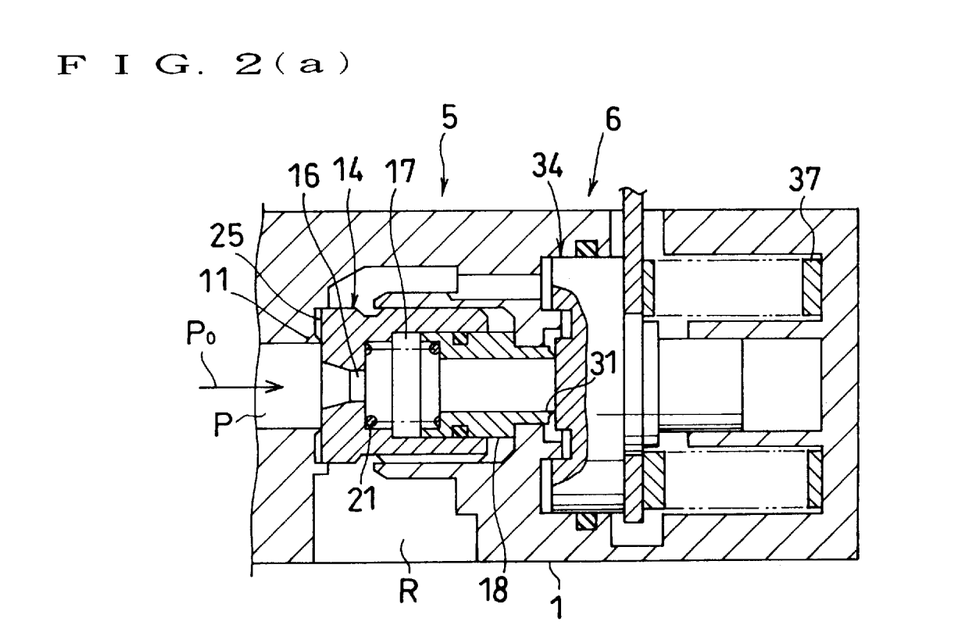
FIG. 2(a) is a schematic view showing the safety valve assembly while it is closed.
Figure 2B:
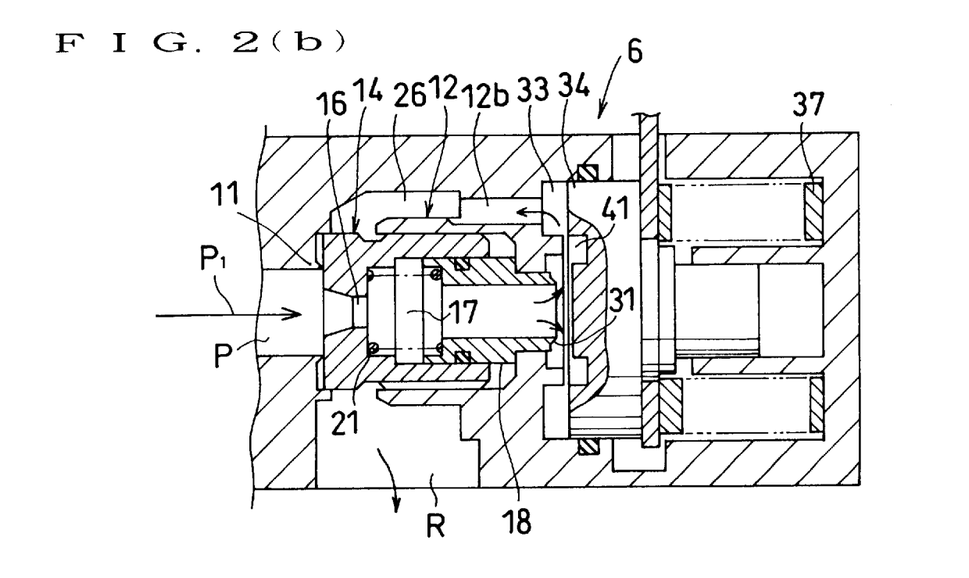
FIG. 2(b) is a schematic view showing the safety valve assembly when it starts opening.

The invention of claim 1 operates in the following manner, for example, as shown in FIGS. 2(a) and 2(b) as well as in FIGS. 3(a) and 3(b).

As shown in FIG. 2(a), in a state of a normal pressure (Po) where the pressure port (P) has a pressure lower than a set pressure for a safety operation, the pushing means 37 has a valve closing force which overcomes a valve opening force produced by pressurized fluid within the second valve seat 31 to bring the second closure member 34 into closing contact with the second valve seat 31. At the same time, a valve opening force that pressurized fluid within the first valve seat 11 produces is overcome by a force resultant from a valve closing force produced by pressurized fluid within the actuation chamber 17 for valve closing and a valve closing force of the urging means 21 to bring the first closure member 14 into closing contact with the first valve seat 11.

As shown in FIG. 2(b), when pressurized fluid within the pressure port (P) has increased to have an abnormal pressure ($P_1$), the second closure member 34 separates from the second valve seat 31 to discharge the pressurized fluid within the pressure port (P) to the discharge port (R) through the restricting passage 16 and the second valve seat 31. Then the actuation chamber 17 for valve closing has an inner pressure rapidly decreased due to flow resistance of the pressurized fluid passing through the restricting passage 16. Thus the valve opening force produced by the pressurized fluid within the first valve seat 11 becomes larger than the force resultant from the valve closing force produced by the pressurized fluid within the actuation chamber 17 and the valve closing force of the urging means 21.

Figure 3A:
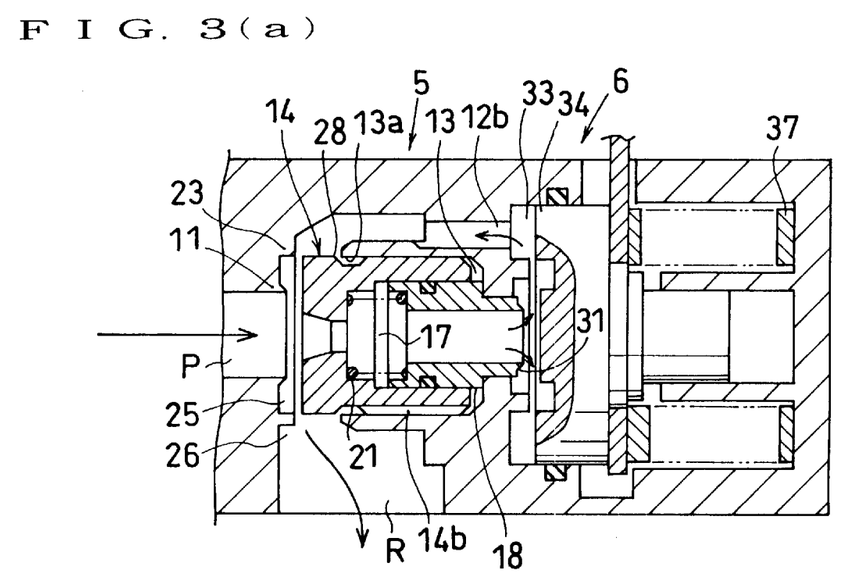
FIG. 3(a) is a schematic view showing the safety valve assembly when it is fully opened.

The above differential force separates the first closure member 14 from the first valve seat 11 as shown in FIG. 3(a) to rapidly discharge the pressurized fluid within the first valve seat 11 to the discharge port (R) through the valve-opening holding chamber 25.

The discharge of the pressurized fluid quickly reduces the inner pressure of the pressure port (P). This also decreases the inner pressure of the second valve seat 31. Then, first the second closure member 34 is brought into closing contact with the second valve seat 31 through a pushing force of the pushing means 37 to enhance the inner pressure of the actuation chamber 17 to a value near that of the inner pressure of the first valve seat 11. Therefore, the first closure member 14 is pushed in the closing direction through the valve closing force of the pressurized fluid within the actuation chamber 17.

Figure 3B:
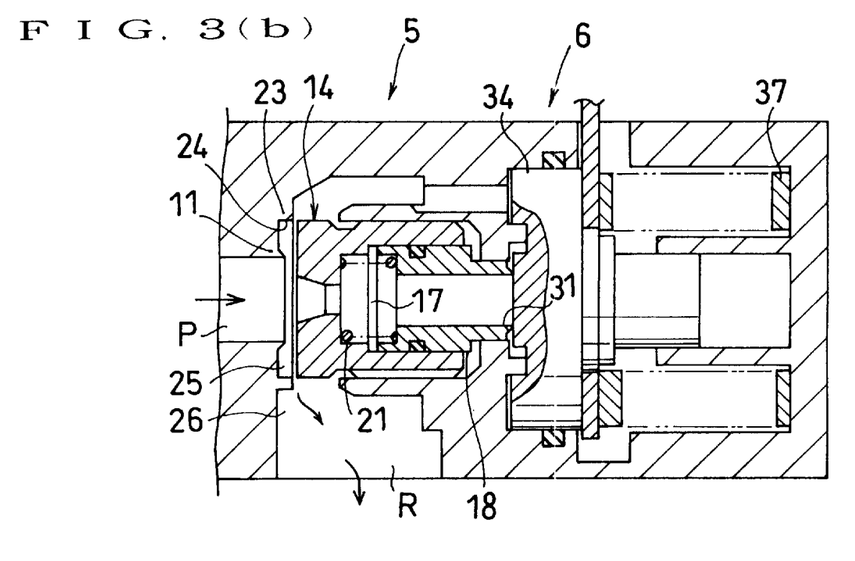
FIG. 3(b) is a schematic view showing the safety valve assembly while it is closing.

However, as shown in FIG. 3(b), just before a leading end of the first closure member 14 starts fitting with a front end of the fitting wall 23, limitation is put on the discharge of the pressurized fluid from the valve-opening holding chamber 25 to the discharge port (R). Consequently, the valve-opening holding chamber 25 has its pressure increased to a value near that of the inner pressure of the first valve seat 11. This retains the first closure member 14 separated from the first valve seat 11 through the thus increased inner pressurizing force of the valve-opening holding chamber 25.

And the pressurized fluid within the pressure port (P) is discharged to the discharge port (R) via the interior area of the first valve seat 11, the holding chamber 25 and the separating gap in order. When the pressure port (P) has almost lost its pressure, an urging force of the urging means 21 brings the first closure member 14 into closing contact with the first valve seat 11.

The invention as set forth in claim 1 produces the following effects since it is constructed and functions as mentioned above.

When the safety valve assembly performs the safety operation, it is possible to discharge a large amount of fluid from the first valve seat having a large sectional area. Accordingly, there is no need for enlarging the sectional area of the second valve seat so as to increase a maximum relief amount. This reduces a pressure receiving area for starting the valve opening of the second closure member to be brought into closing contact with the second valve seat. As a result, it is possible to downsize the pushing means for the second closure member and therefore make the safety valve assembly compact.

Besides, the actuation chamber for valve closing reduces its pressure interlockingly with the separation of the second closure member from the second valve seat. This immediately separates the first closure member from the first valve seat to result in the possibility of quickly performing the safety operation.

Additionally, the first closure member is pressurized for opening with the pressure of the fluid within the valve-opening holding chamber once it opens. Therefore, it is kept open irrespective of the second closure member being opened or closed. This makes it possible to smoothly and rapidly discharge the abnormal pressure of the pressure port without hunting.

As indicated by an invention of claim 2, it is preferable to add the following construction to the invention of claim 1.

For instance, as shown in FIG. 3(a), the first closure member 14 is inserted into a first valve chamber 13 opening toward the first valve seat 11 so as to be able to make an opening and closing movement. The first closure member 14 has an outer peripheral surface provided with a limiting portion 28 which limits the flow-out of fluid at a bottom portion of the first valve chamber 13 from an opened portion of the first valve chamber 13, when the first closure member 14 has made a further opening movement over a predetermined distance.

The invention of claim 2 can damp the opening movement of the first closure member through limiting the flow-out of the fluid at the bottom portion of the first valve chamber by the limiting portion at a final time of the opening movement of the first closure member. This can prevent the first closure member from making more opening movement than required to collide with a bottom wall of the first valve chamber. As a result, it is possible to shorten an axial length of the first valve chamber and make the safety valve assembly more compact.

BRIEF DESCRIPTION OF THE DRAWINGS

FIGS. 1 to 3 show a first embodiment of the present invention;

DESCRIPTION OF THE PREFERRED EMBODIMENTS

Figure 1:
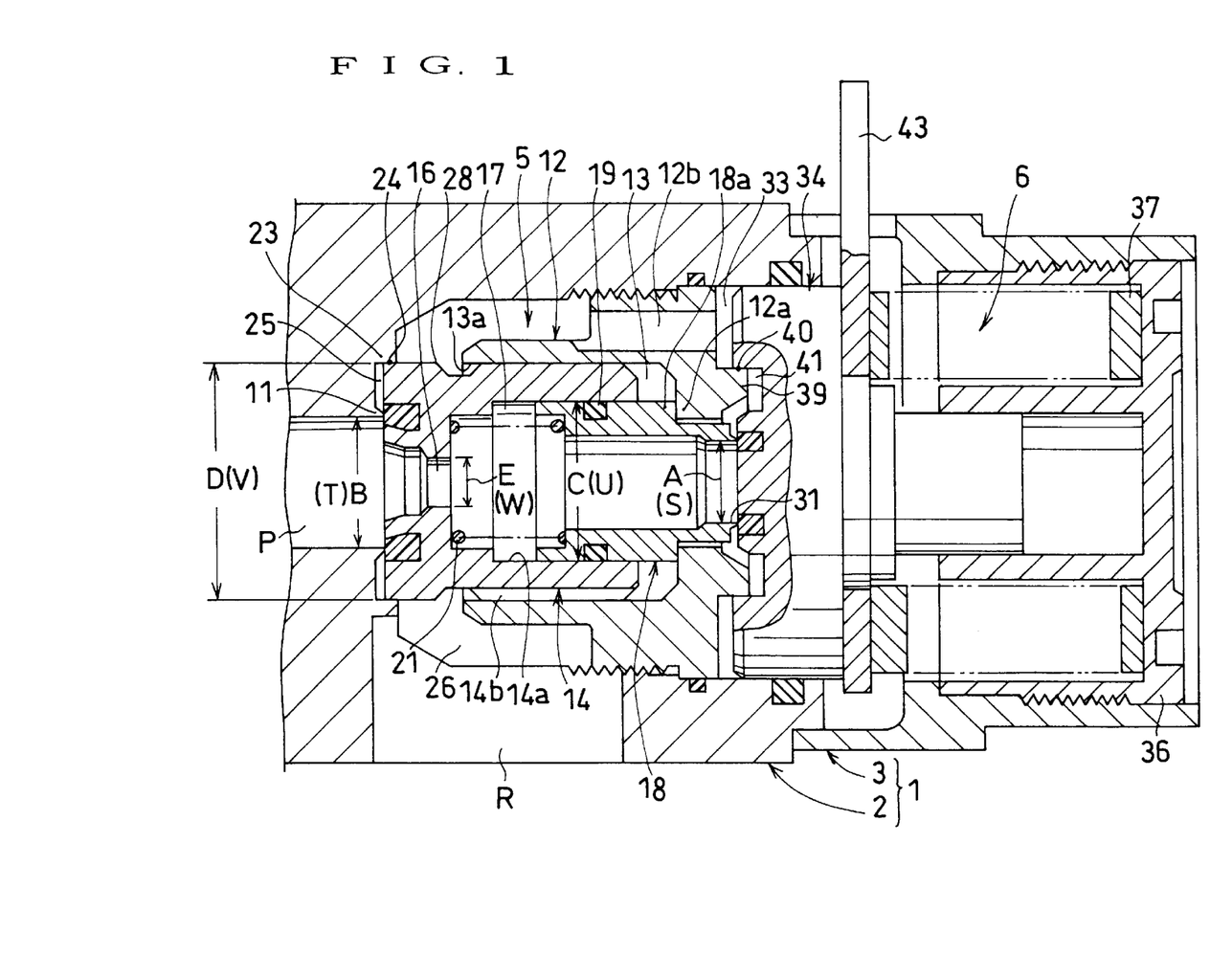
FIGS. 1 is a sectional view in elevation of a safety valve assembly.

FIGS. 1 to 3 show a first embodiment of the present invention and illustrate an example case, in which a safety valve assembly according to the present invention is applied to a hydraulic overload protector for a mechanical press.

Initially, explanation is given for a construction of the safety valve assembly by relying on a sectional view in elevation of FIG. 1.

The safety valve assembly has a housing 1, which is constructed by connecting a housing main body 2 to a cap case 3 in a left and right direction. The housing main body 2 has a left mid portion provided with a pressure port (P) and has a lower portion provided with a discharge port (R).

Although not shown, the pressure port (P) is connected to an overload absorbing hydraulic chamber formed within a slide of a mechanical press and the discharge port (R) is connected to an oil reservoir.

A main valve 5 and a pilot valve 6 are arranged in the left and right direction in a horizontally long cavity within the housing 1.

The main valve 5 is constructed as follows.

The pressure port (P) has a right end provided with a first valve seat 11 between the pressure port (P) and the discharge port (R). A support cylinder 12 engages with a central portion within the housing main body 2 in screw-thread fitting. The support cylinder 12 has a cylindrical hole which forms a first valve chamber 13 opening toward the first valve seat 11. A first closure member 14 is inserted into the first valve chamber 13 so as to be able to make an opening and closing movement to the first valve seat 11.

The first closure member 14 has a cylindrical hole 14a within which a restricting passage 16 and an actuation chamber 17 for valve closing are arranged in series.

More specifically, the cylindrical hole 14a of the first closure member 14 has a left side portion provided with the restricting passage 16, which communicates with an interior area of the first valve seat 11. The cylindrical hole 14a has a right half portion into which a slide cylinder 18 is inserted hermetically by a sealing member 19. The sealing member 19 has a sealing surface defining an inner space which forms the actuation chamber 17 for valve closing.

A compression spring 21 of an urging means is attached between a left portion of the slide cylinder 18 and the first closure member 14. The compression spring 21 brings the first closure member 14 into contact with the first valve seat 11 and brings a stepped portion 18a of the slide cylinder 18 into contact with a radially reduced portion 12a of the support cylinder 12.

The housing main body 2 projects rightward relatively to a right end surface of the first valve seat 11 in a radially outer space of the latter. The projecting portion forms an annular fitting wall 23 into which the first closure member 14 fits by a predetermined length in an opening and closing direction. A fitting portion 24 of the fitting wall 23 defines an inner space which constructs a valve-opening holding chamber 25. The pressure port (P) can communicate with the discharge port (R) through the interior area of the first valve seat 11, the valve-opening holding chamber 25, a fitting clearance of the fitting portion 24 and an annular outlet chamber 26 in order.

Further, there is provided a means which limits the flow-out of fluid at a bottom portion of the first valve chamber 13 from an opened portion of the first valve chamber 13 when the first closure member 14 has made a further opening movement over a predetermined distance. Here the limiting means is constructed by a limiting portion 28 provided on an outer peripheral surface of the first closure member 14 and an open end 13a of the first valve chamber 13.

The pilot valve 6 is constructed as follows.

The slide cylinder 18 has a right end provided with a second valve seat 31. A second valve chamber 33 is formed at a mid portion in the left and right direction within the housing 1. A second closure member 34 is hermetically inserted into the second valve chamber 33. The second closure member 34 makes an opening and closing movement to the second valve seat 31. A pushing spring 37 of a pushing means is attached between a cap bolt 36 engaged with the cap case 3 in screw-thread fitting and the second closure member 34.

The support cylinder 12 has a right end projecting into the second valve chamber 33 outside the second valve seat 31 and radially thereof. The annular projection 39 has an outer peripheral surface onto which the second closure member 34 fits by a predetermined length in an opening and closing direction. The fitting portion 40 defines an inner space which forms an accelerating chamber 41 for valve opening.

The operating condition of the pilot valve 6 is judged through detecting a moving amount of an upper portion of an arm 43 attached to the second closure member 34 by a limit switch or the like sensor (not shown).

In the main valve 5 and the pilot valve 6, respective sealing sectional areas of the above-mentioned constituting members are related with each other as follows.

A sealing sectional area (S) corresponding to a sealing diameter (A) of the second valve seat 31, a sealing sectional area (T) corresponding to a sealing diameter (B) of the first valve seat 11, a pressurizing sectional area (U) corresponding to a sealing diameter (C) of the actuation chamber 17 for valve closing and a pressurizing sectional area (V) of the valve-opening holding chamber 25 corresponding to a diameter (D) of the fitting portion 24 have values enlarging one after the other in the mentioned order.

Although a sectional area (W) corresponding to a diameter (E) of the restricting passage 16 is set to a value not more than that of the sealing sectional area (S) of the second valve seat 31 here, there is no problem if it has a value smaller than that of the sealing sectional area (T) of the first valve seat 11.

Then how the safety valve assembly of the foregoing construction operates is explained by relying on schematic views of FIGS. 2 and 3.

In a state where overload is not imposed on the mechanical press, as shown in FIG. 2(a), the pressure port (P) has a pressure which is a normal pressure (Po)(here about 100 kgf/cm² 'about 10 MPa') lower than a set pressure for a safety operation (here about 230 kgf/cm 'about 23 MPa') and the pilot valve 6 as well as the main valve 5 is closed.

More specifically, the second closure member 34 is pushed rightward by pressurized oil within the second valve seat 31 and is brought into closing contact with the second valve seat 31 through an urging force of the pushing spring 37. Further, the first closure member 14 is brought into closing contact with the first valve seat 11 through a differential force obtained by deducting a rightward pushing force that the pressurized oil within the first valve seat 11 produces, from a leftward pressurizing force that the pressurized oil within the actuation chamber 17 for valve closing produces (and a leftward urging force of the compression spring 21).

When the pressure of the pressure port (P) has exceeded the set pressure with overload imposed on the mechanical press, the pilot valve 6 opens as shown in FIG. 2(b). More specifically, when the pressurized oil within the pressure port (P) (and within the second valve seat 31) has increased to have an abnormal pressure ($P_1$) exceeding the set pressure, first the second closure member 34 slightly separates from the second valve seat 31. Then the pressurized oil flows into the accelerating chamber 41 for valve opening through the separating gap and a large pressurizing force which acts on the accelerating chamber 41 of a large sectional area rapidly moves the second closure member 34 rightward for opening.

Thus the pressurized oil within the pressure port (P) is discharged to the oil reservoir (not shown) through the restricting passage 16, the second valve seat 31, the accelerating chamber 41 for valve opening, the second valve chamber 33, a communication hole 12b of the support cylinder 12, the outlet chamber 26 and the discharge port (R) in order. Simultaneously, oil pressure within the actuation chamber 17 for valve closing quickly decreases due to flow resistance of the pressurized oil passing through the restricting passage 16.

In consequence, a valve opening force produced by high pressurized oil within the first valve seat 11 becomes larger than a force resultant from a small pressurizing force for valve closing produced by low pressurized oil within the actuation chamber 17 and a valve closing force of the compression spring 21. And the differential force rapidly separates the first closure member 14 from the first valve seat 11 as shown in FIG. 3(a). This quickly discharges the pressurized oil within the first valve seat 11 to the oil reservoir (not shown) through the valve-opening holding chamber 25, the outlet chamber 26 and the discharge port (R) in order.

Rapid reduction of the inner pressure of the pressure port (P) by the discharge of the pressurized oil entails a reduction of the inner pressure of the second valve seat 31. Therefore, the pilot valve 6 and the main valve 5 operate in the following manner as shown in FIG.3(b).

First an urging force of the pushing spring 37 brings the second closure member 34 into closing contact with the second valve seat 31. Then the inner pressure of the actuation chamber 17 for valve closing increases to a value near that of the inner pressure of the first valve seat 11, which results in pushing the first closure member 14 in the closing direction by the pressurizing force for valve closing of the pressurized oil within the actuation chamber 17.

However, just before a leading end of an outer peripheral surface of the first closure member 14 starts fitting with a front end of an inner peripheral surface of the fitting wall 23, limitation is put on the discharge of the pressurized oil from the valve-opening holding chamber 25 to the discharge port (R). Consequently, the valve-opening holding chamber 25 increases its inner pressure to a value near that of the inner pressure of the first valve seat 11. The thus increased inner pressurizing force of the holding chamber 25 keeps the first closure member 14 separated from the first valve seat 11.

And the pressurized oil within the pressure port (P) is discharged to the discharge port (R) through the interior area of the first valve seat 11, the valve-opening holding chamber 25, a clearance between the front end of the fitting wall 23 and the leading end of the first closure member 14, and the outlet chamber 26 in order. When the pressure port (P) has almost lost its pressure (for instance, reduced it to a pressure of about 0.1 kgf/cm² 'about 0.01 MPa'), the urging force of the compression spring 21 brings the first closure member 14 into closing contact with the first valve seat 11.

When the first closure member 14 makes an opening movement as shown in FIG. 3(a), between an initial time of the opening movement and a middle time thereof, the pressurized oil at the bottom portion of the first valve chamber 13 smoothly flows out to the outlet chamber 26 through an outer peripheral groove 14b of the first closure member 14. On the other hand, at a final time of the opening movement, the limiting portion 28 of the first closure member 14 approaches the open end 13a of the first valve chamber 13 to thereby limit the flow-out of the pressurized oil at the bottom portion of the first valve chamber 13. And a damping action of the pressurized oil within the bottom portion of the first valve chamber 13 can prevent the first closure member 14 from making more opening movement than required to collide with a bottom wall of the first valve chamber 13.

Figure 4:
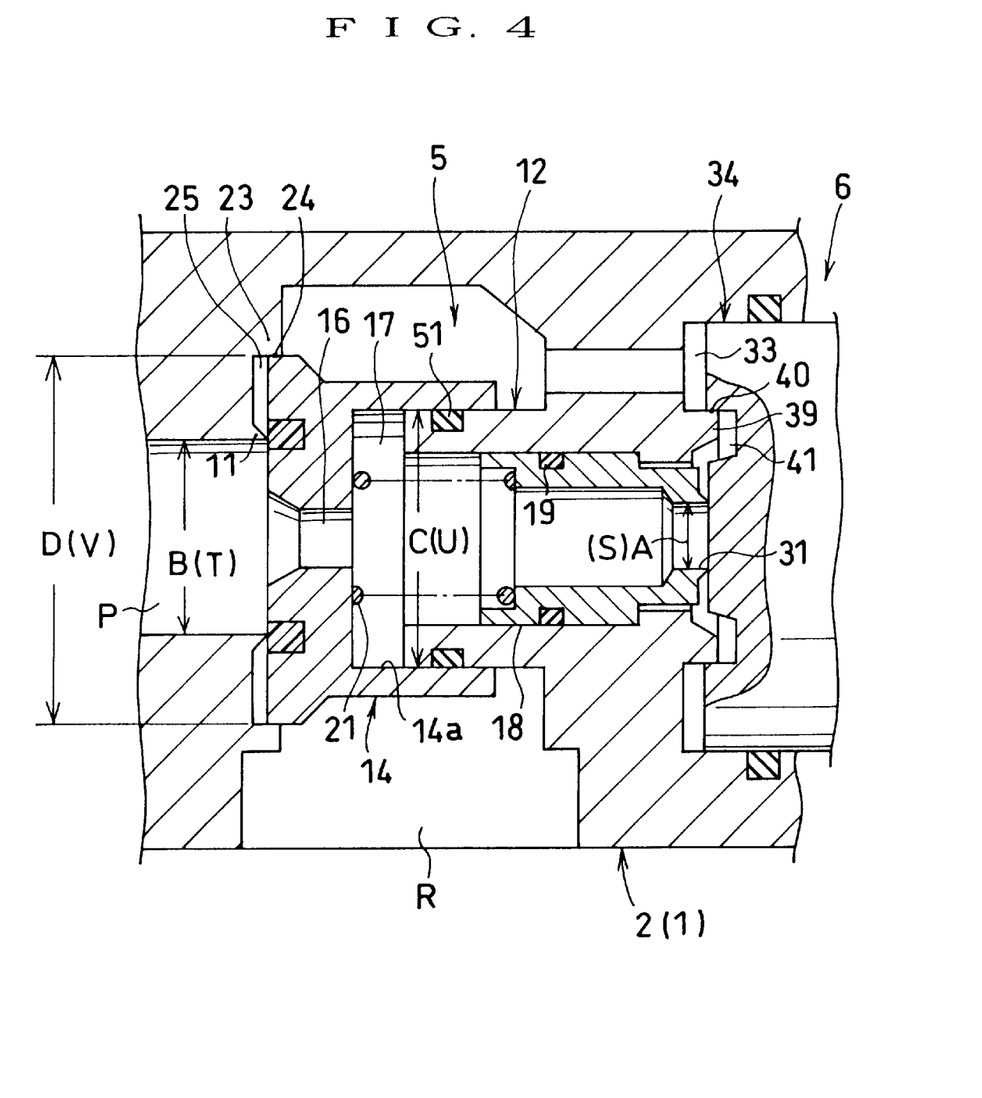
FIG. 4 shows a second embodiment of the present invention and corresponds to FIG. 1.
Figure 5:
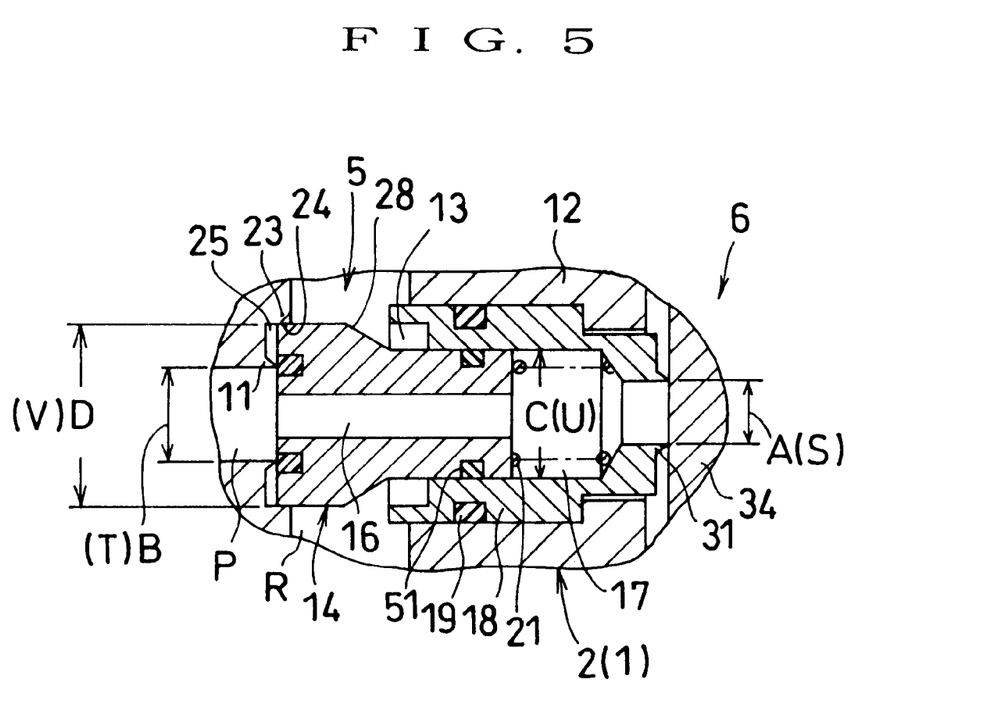
FIG. 5 shows a third embodiment of the present invention and corresponds to FIG. 1.

FIGS. 4 and 5 show a second and a third embodiments, respectively and correspond to FIG. 1. In these other embodiments the same constituting members as those shown in FIG. 1 are designated by the same characters.

FIG. 4 showing the second embodiment exemplifies a safety valve assembly having a larger volume than the safety valve assembly shown in FIG. 1 and different therefrom on the following points.

The support cylinder 12 fixed within the housing 1 has a cylindrical hole into which the slide cylinder 18 is inserted hermetically by the sealing member 19. The first closure member 14 fits onto an outer peripheral surface of the support cylinder 12 hermetically by another sealing member 51. This can enlarge the sealing diameter (B) of the first valve seat 11 and the diameter (D) of the fitting portion 24 while retaining the sealing diameter (A) of the second valve seat 31 at a small value.

Thus it is possible to increase a maximum relief amount of the first valve seat 11 and make the safety valve assembly of larger volume compact.

In the case where the second embodiment is provided with a means for limiting a further opening movement of the first closure member 14 over a predetermined distance, it is sufficient if the first closure member 14 has its outer peripheral space partitioned to form a first valve chamber and is provided on its outer peripheral surface with a limiting portion which faces a peripheral wall of the first valve chamber.

FIG. 5 showing the third embodiment exemplifies a safety valve assembly different from the safety valve assembly illustrated in FIG. 1 showing the first embodiment on the following points.

The housing 1 has the support cylinder 12 into which the slide cylinder 18 is inserted hermetically by the sealing member 19. The slide cylinder 18 has a cylindrical hole into which a right half portion of the first closure member 14 is inserted hermetically by another sealing member 51. The actuation chamber 17 for valve closing is formed in the cylindrical hole of the slide cylinder 18. The restricting passage 16 extends through the first closure member 14 in the left and right direction.

Further, the first valve chamber 13 is formed in a left portion within the cylindrical hole of the slide cylinder 18.

When the first closure member 14 starts the opening movement, the limiting portion 28 provided on the first closure member 14 can approach an open end of the first valve chamber 13.

The respective embodiments can be modified as follows.

The urging means for the main valve 5 may employ rubber or the like resilient member instead of the exemplified spring 21.

The fitting wall 23 is sufficient if it fits onto the first closure member 14 at the final time of the closing movement of the first closure member 14. In consequence, the first closure member 14 may project an outer peripheral portion of its left surface leftward relatively to a mid portion thereof instead of projecting a right end surface of the fitting wall 23 relatively to a sealing surface of the first valve seat 11.

Further, the first closure member 14 may fit onto the fitting wall 23 instead of fitting thereinto.

The pushing means for the pilot valve 6 may utilize compressed air or the like fluid pressure instead of the exemplified urging force of the pushing spring 37. The second valve seat 31 of the pilot valve 6 may be provided in a fixed portion such as the support cylinder 12 instead of being provided in the slide cylinder 18.

It is a matter of course that two discharge ports (R) may be provided separately as one for the main valve 5 and the other for the pilot valve 6 instead of providing only one discharge port (R) which serves for both of them.

Although the safety valve assembly according to the present invention is preferably used to an overload protector for a mechanical press, it may be employed as a safety device for a hydraulic circuit or a pressure vessel.

The safety valve assembly may handle other kinds of liquid and besides gas such as air instead of the pressurized oil.

What is claimed is:

1. A safety valve assembly having a main valve (5) and a pilot valve (6) arranged between a pressure port (P) and a discharge port (R), the main valve (5) being adjusted to open when the pilot valve (6) opens, the safety valve assembly comprising:

the main valve (5) comprising a first valve seat (11) provided between the pressure port (P) and the discharge port (R), a first closure member (14) which makes an opening and closing movement to the first valve seat (11) and an urging means (21) which urges the first closure member (14) to the first valve seat (11);

a restricting passage (16) having an inlet and an outlet and being provided within the first closure member (14), the inlet communicating with an interior area of the first valve seat (11);

an actuation chamber (17) for valve closing which communicates with the outlet of the restricting passage (16) and pressurizes the first closure member (14) in a closing direction;

a fitting wall (23) having a fitting portion (24) with which the first closure member (14) fits by a predetermined length at a final time of its closing movement, the fitting wall (23) being arranged between the pressure port (P) and the discharge port (R) in a radially outer space of the first valve seat (11);

a valve-opening holding chamber (25) formed from an inner space defined by the fitting portion (24);

the pilot valve (6) comprising a second valve seat (31) provided between the actuation chamber (17) for valve closing and the discharge port (R), a second closure member (34) which makes an opening and closing movement to the second valve seat (31), and a pushing means (37) which brings the second closure member (34) into closing contact with the second valve seat (31); and a sealing sectional area (S) of the second valve seat (31), a sealing sectional area (T) of the first valve seat (11), a pressurizing sectional area (U) of the actuation chamber (17) and a pressurizing sectional area (V) of the valve-opening holding chamber (25) set to values enlarging one after the other in the mentioned order.

2. The safety valve assembly as set forth in claim 1, wherein a first valve chamber (13) has a bottom portion and an open end (13a) and opens toward the first valve seat (11), the first closure member (14) being inserted into the first valve chamber (13) and having an outer peripheral surface, a limiting portion (28) being provided on the outer peripheral surface of the first closure member (14) and limiting the flow-out of fluid at the bottom portion of the first valve chamber (13) from the open end (13a) when the first closure member (14) has made a further opening movement over a predetermined distance.

3. The safety valve assembly as set forth in claim 1, wherein the fitting wall (23) has an inner peripheral surface and the first closure member (14) has an outer peripheral surface, the inner peripheral surface fitting with the outer peripheral surface.

4. The safety valve assembly as set forth in claim 1, wherein the actuation chamber (17) for valve closing is formed within the first closure member (14).

5. The safety valve assembly as set forth in claim 2, wherein the fitting wall (23) has an inner peripheral surface, which fits with the outer peripheral surface of the first closure member (14).

6. The safety valve assembly as set forth in claim 2, wherein the actuation chamber (17) for valve closing is formed within the first closure member (14).

7. The safety valve assembly as set forth in claim 3, wherein the actuation chamber (17) for valve closing is formed within the first closure member (14).

* * * * *